United States Patent

[11] 3,616,978

[72] Inventor James F. Haslam
 Kettering, England
[21] Appl. No. 745,757
[22] Filed July 18, 1968
[45] Patented Nov. 2, 1971
[73] Assignee Stewarts and Lloyds Limited
 Glasgow, Scotland
[32] Priorities July 26, 1967
[33] Great Britain
[31] 34,455/67;
 May 2, 1968, Great Britain, No. 20,970/68

[54] CONVEYORS
 4 Claims, 13 Drawing Figs.
[52] U.S. Cl. ................................................ 226/93,
  198/41, 310/12
[51] Int. Cl. ................................................... B65h 17/28
[50] Field of Search ......................................... 198/41, 1,
  184; 226/93, 94; 310/12, 14, 13; 104/148

[56] References Cited
 UNITED STATES PATENTS
 1,441,250 1/1923 Smith .......................... 198/41 X
 2,588,085 3/1952 Clouse.......................... 198/41
 2,767,823 10/1956 Beamish ....................... 198/41
 1,706,741 3/1929 Pugh ............................ 226/93
 FOREIGN PATENTS
 151,487 9/1955 Finland ........................ 198/41
 OTHER REFERENCES
 Engineering Ltd., April 26, 1966, pp. 835- 840, Outline 17, Linear Induction Motors (Applicant Citation).

Primary Examiner— Richard E. Aegerter
Assistant Examiner— Douglas D. Watts
Attorney— Stevens, Davis, Miller & Mosher ABSTRACT: A conveyor has a linear motor for accelerating or decelerating objects by magnetic induction as the objects travel over rollers. The rollers are adapted to the shape of the objects and the motor may extend around the path of the objects. Control means actuated by the objects control the energization of the motor.

PATENTED NOV 2 1971
3,616,978
SHEET 1 OF 6
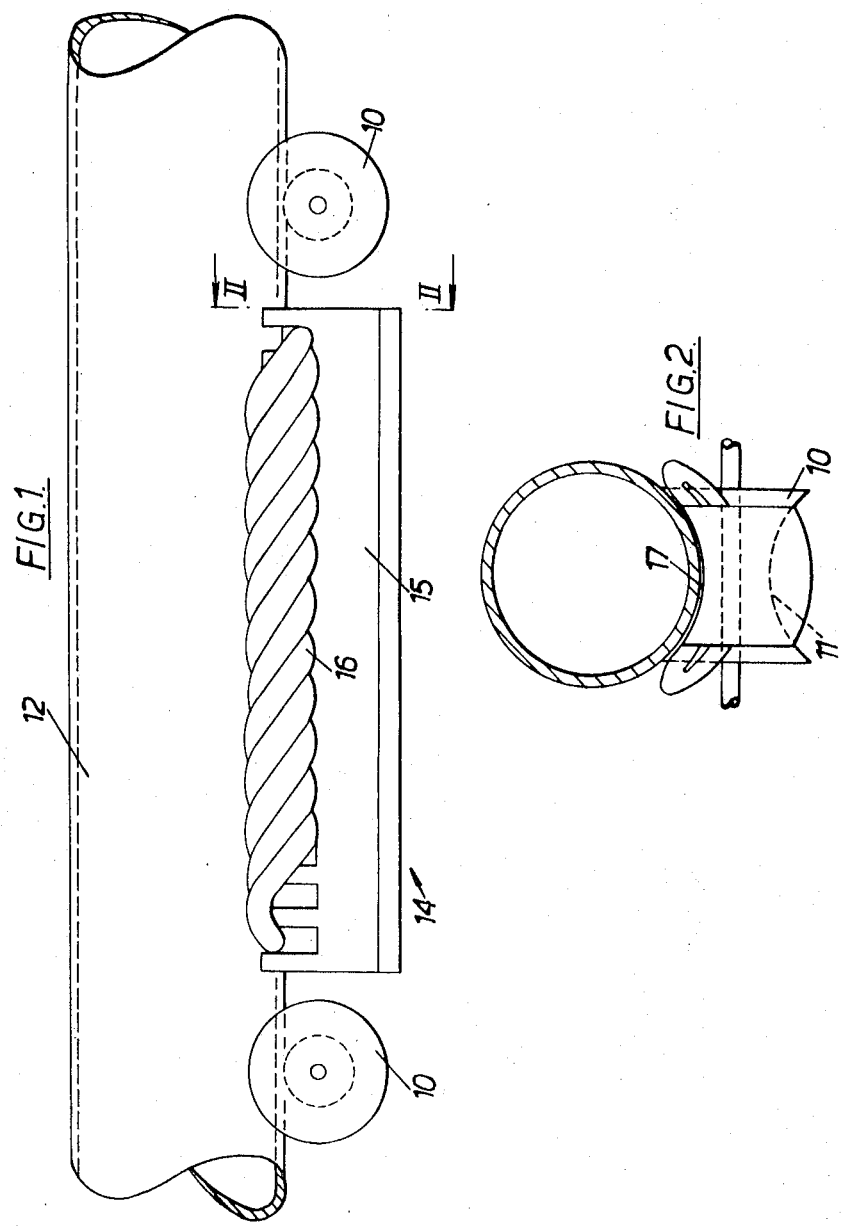
Inventor
JAMES F. HASLAM
By Stevens, Davis, Miller & Mosher
Attorneys

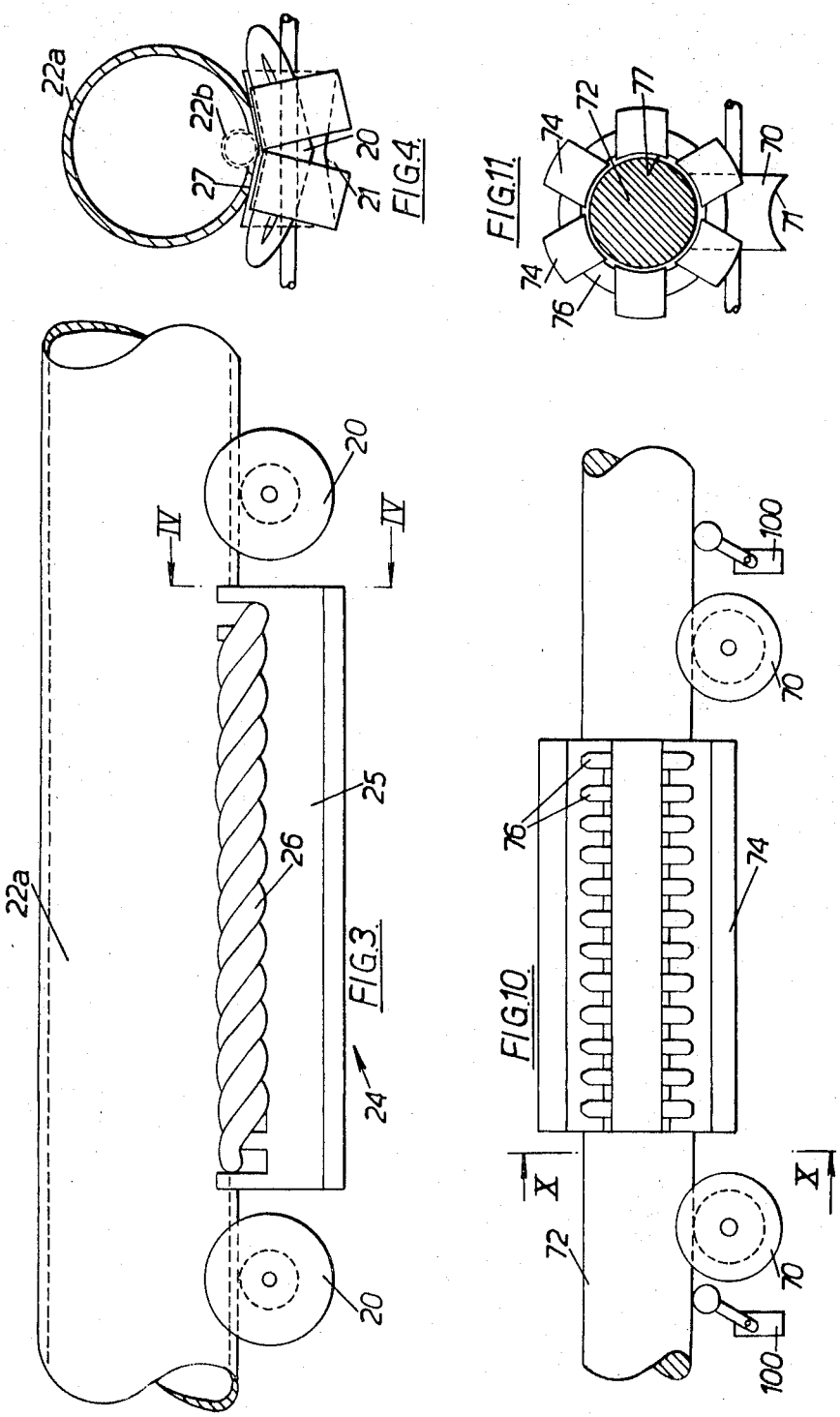

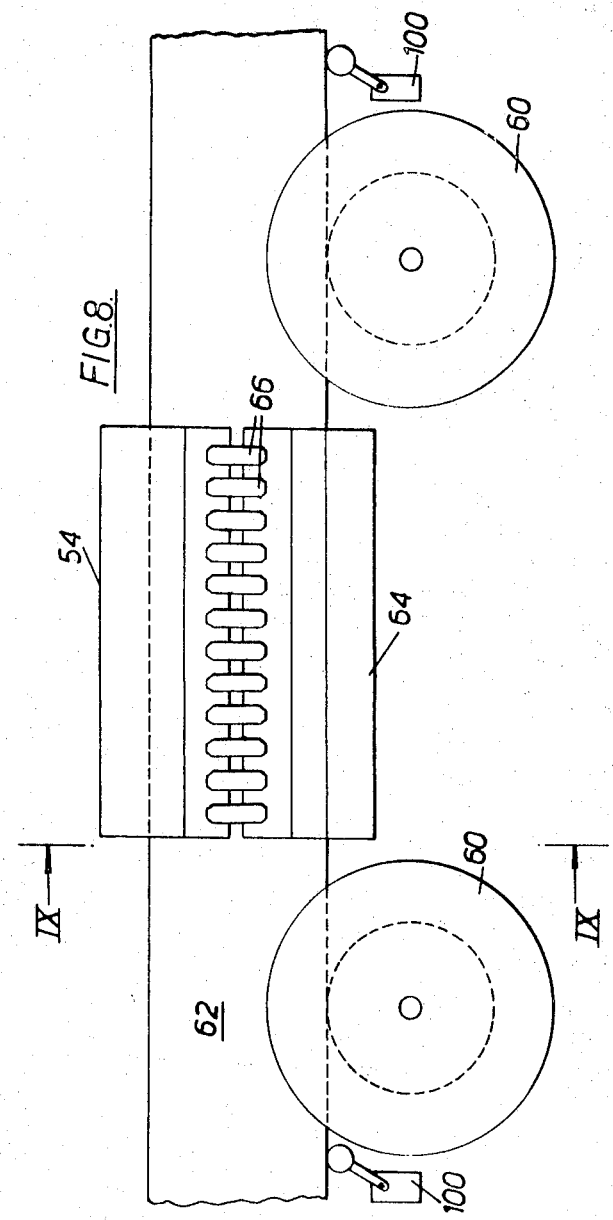

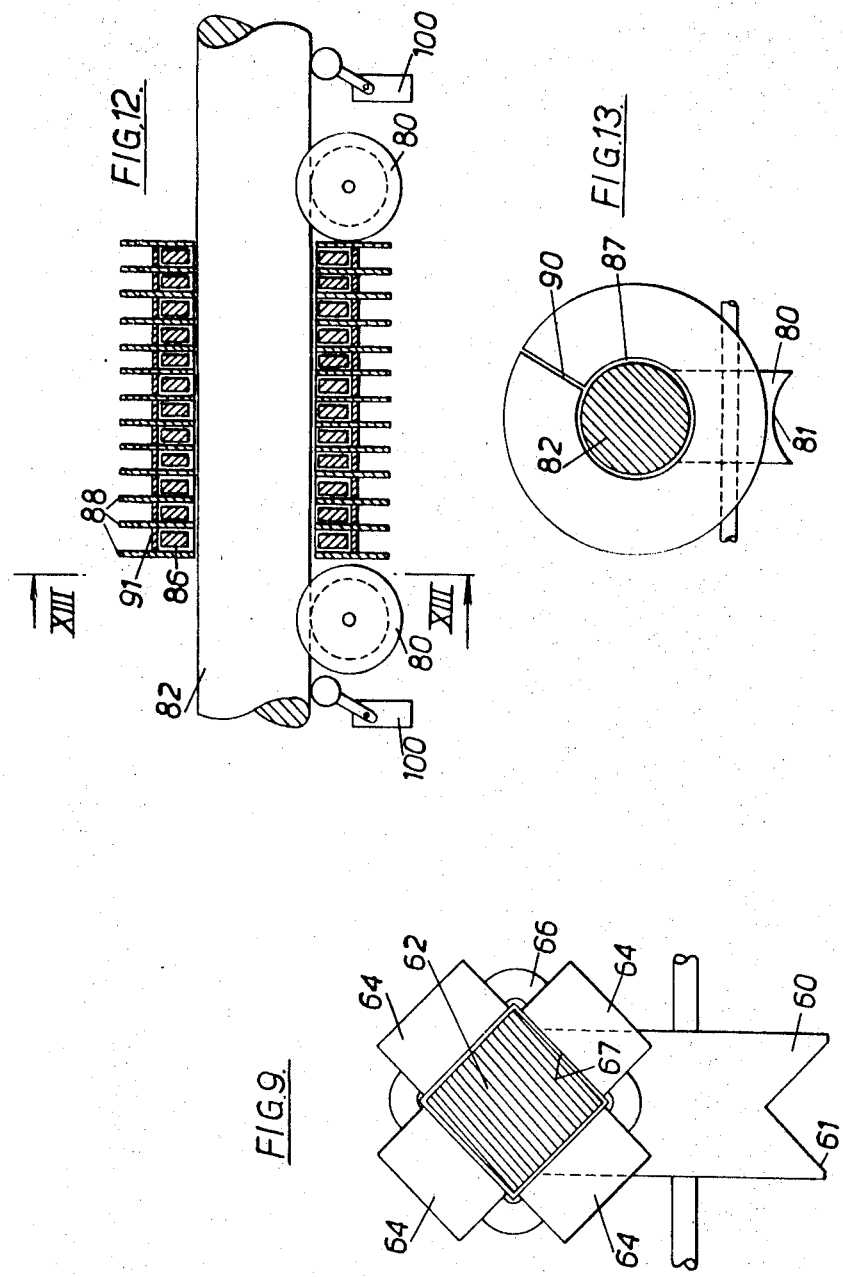

CONVEYORS

The present invention relates to conveyors.

For conveying tubes, bar stocks etc., conveyors comprising driven rollers for supporting and propelling tubes have the disadvantage that the articles being conveyed may skid on the rollers and it is therefore necessary to provide sufficient spacing between successive articles to allow for such skidding, which detracts from the efficient running of the conveyors.

The present invention provides a conveyor comprising a pair of spaced supports and a linear motor disposed adjacent a path of travel of objects to be conveyed, the path extending over the supports, the arrangement being such that in operation of the conveyor the objects are supported by the supports and accelerated or decelerated by magnetic induction from the linear motor.

The invention will be more readily understood from the following description of the embodiments thereof which are given by way of example and illustrated in the accompanying drawings, wherein:

FIG. 1 shows a side view of parts of a conveyor;

FIG. 2 shows a view taken in section along the line II—II of FIG. 1;

FIG. 3 shows a side view of part of a further conveyor;

FIG. 4 shows a view taken in section along the line IV—IV of FIG. 3;

FIG. 8 shows a side view of a conveyor unit having a four-core linear motor for use in conveying solid or hollow objects of square cross section;

FIG. 9 shows a view taken in section along the line IX—IX of FIG. 8;

FIG. 10 shows a side view of a conveyor unit having a six-core linear motor for use in conveying solid or hollow cylindrical objects;

FIG. 11 shows a view taken in section along the line X—X of FIG. 10;

FIG. 12 shows a side view, partly in section, of a conveyor unit having a cylindrical linear motor for use in conveying solid or hollow cylindrical objects; and FIG. 13 shows a view taken in section along the line XIII—XIII of FIG. 12.

Figure 5:
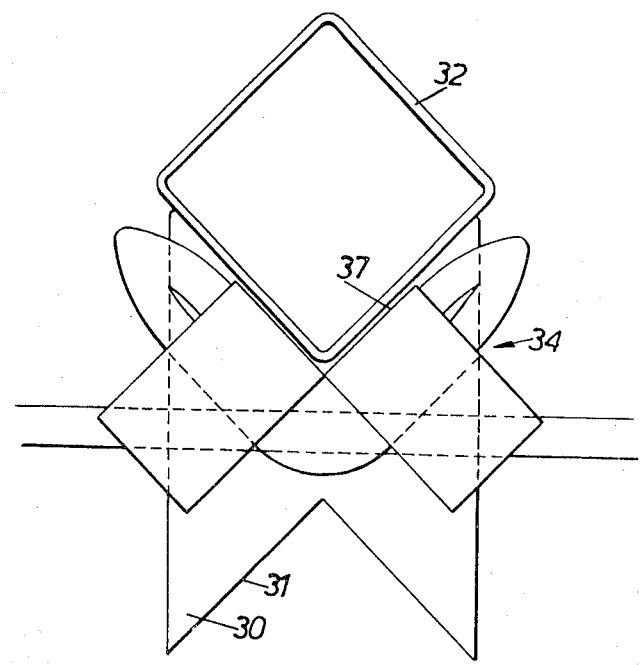
FIG. 5 shows an end view of parts of a third conveyor.

As shown in FIGS. 1 and 2 a tube conveyor has two rollers 10 freely rotatable on ball bearings (not shown) about parallel axes and each having a peripheral recess 11 of concave arcuate cross section corresponding to the diameter of a tube 12 to be conveyed.

The tube 12 is supported on the rollers 10 for longitudinal movement, and is located vertically and laterally by peripheral recesses 11.

For propelling the tube 12 longitudinally over the rollers 10, a linear motor indicated generally by reference numeral 14 is disposed beneath and adjacent the path of travel of the tube 12, the linear motor 14 comprising a core 15 and windings 16 in slots in the core 15.

As can be seen from FIG. 2, the upper face of the linear motor 14 is formed with a longitudinal recess 17 of concave and arcuate cross section corresponding to that of the tube 12 to provide a small, uniform airgap between the tube 12 and the linear motor 14.

The longitudinal recess 17 in the linear motor 14 and the peripheral recesses 11 in the rollers 10 are shaped so that the conveyor operates efficiently with a tube having the outer diameter of the tube 12. For tubes of other diameters, the airgap between each tube and the linear motor 14 would be nonuniform and the conveyor would operate less efficiently.

For use with tubes of various sizes, the recesses in the rollers and the linear motor may be formed with V-shaped cross sections as shown in FIGS. 3 and 4, wherein parts corresponding to those of FIGS. 1 and 2 are indicated by corresponding reference numerals increased by 10.

As shown in FIGS. 3 and 4, the rollers 20 each have a peripheral recess 21 of V-shaped cross section, the linear motor 24 has a longitudinal recess 27 which is also of V-shaped cross section, the linear motor 24 being split longitudinally into two parts as can be seen from FIG. 4. The inclinations of the walls of the recesses 21 and 27 are equal. When a tube 22a of large diameter is supported in the V-shaped recesses 21 of the rollers 20, the bottom of the tube 22a is at a height which is higher than the height at which the bottom of a tube 22b of smaller diameter would be if the tube 22a were replaced by the tube 22b. This height difference would introduce appreciable differences in the airgaps between the tubes and the linear motor 24, and the conveyor would operate with correspondingly varying efficiency, if the longitudinal recess 27 in the linear motor 24 were not also of the same V-shaped cross section as the recesses 21. However, with the recesses 21 and 27 shaped as shown, a small airgap which does not vary beyond acceptable limits is obtained for a range of different tube sizes.

FIG. 5 shows an end view of a tube 32 of square cross section supported on a pair of rollers 30 of which only one is shown and which each have a peripheral recess 31 having a V-shaped cross section the sides of which are inclined relative to one another at 45°.

A linear motor 34 is provided which has a longitudinal recess 37 at its side facing the path of the tube 32, the walls of the recess 37 also being inclined to one another at 45°.

The recesses 31 and 37 enable any of a range of tubes of rectangular cross section to be conveyed with a small and constant airgap.

Figure 6:
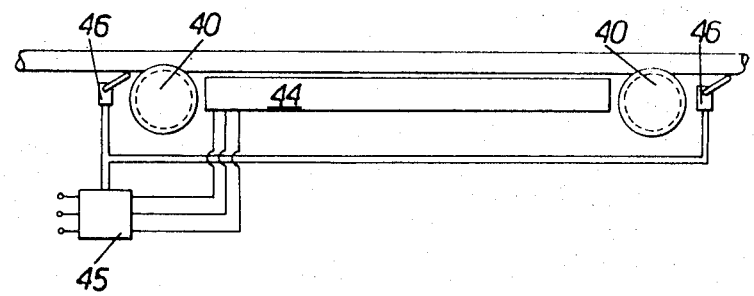
FIG. 6 shows a side view of parts of a conveyor provided with limit switches as tube-sensing means.

When one of the above linear motors is energized without having a tube or other magnetic material disposed above the linear motor to complete a magnetic circuit, the current supplied to the linear motor increases and overheating may result. Moreover, the linear motor exerts a force of attraction on the tube. It is therefore desirable to energize the linear motor only when the tube is supported on the rollers at opposite ends of the linear motor, the motor current being switched on to move the tube along the conveyor and switched off as the trailing end of the tube approaches the linear motor. A mechanical switching arrangement for controlling the motor current in this way is shown in FIG. 6, in which a linear motor is indicated by reference numeral 44 and disposed between a pair of tube support rollers 40. The switching on and off of the current through the linear motor 44 is effected by a three-phase AC contactor 45 controlled by two limit switches 46.

The limit switches 46 are connected in series and disposed with the two support rollers 40 therebetween, so that the contactor 45 is actuated to energize the linear motor 44 only when both limit switches are closed by the tube. In this way, the motor is not energized when the tube is absent from the support rollers 40, and also the tube is not attracted towards the motor before being supported by both support rollers 40, which might otherwise lead to an obstruction. Moreover, the deenergization of the motor as soon as the tube moves away provides economical current consumption.

To avoid failures resulting from wear of the mechanical limit switches 46, the latter may be replaced by proximity switches.

Figure 7:
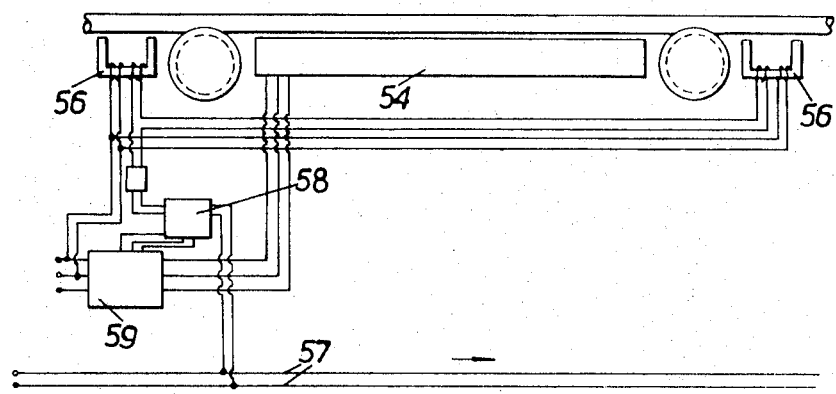
FIG. 7 shows a side view of parts of a conveyor with different tube-sensing means and with a speed control arrangement.

In FIG. 7, there is shown a switching arrangement in which the tube is sensed electromagnetically by means of two open core transformers 56 instead of mechanically by the limit switches 46.

When the tube passes over and bridges the gaps of the two transformers 56, alternating EMF's are induced in the secondary windings of the transformers, and these EMF's are added, rectified and fed to a silicon-controlled rectifier trigger unit 58, which operates a power unit 59 for energizing linear motor 54.

The trigger unit 58 is also controlled by a common control signal fed via conductors 57 to a plurality of the trigger units (not shown) for controlling associated linear motors by phase control of the currents fed to the motors, thus controlling the speed of all the linear motors in a conveyor.

In the conveyor unit shown in FIGS. 8 and 9, a linear motor having four slotted cores 64 is arranged so that inner faces 67 of the cores 64 form a square aligned with the recesses 61, the faces 67 being spaced so as to provide a small constant airgap between the cores 64 and a solid square cross section object 62 to be conveyed.

Windings 66 in the form of four-sided coils are fitted into slots in the cores 64 and are arranged for connection to a three-phase electricity supply so that, when energized, the object 62 will be propelled longitudinally over the rollers 60 by forces exerted by electromagnetic interaction between the cores 64 and the objects 62.

In FIGS. 10 and 11, a linear motor is arranged for propelling an object 72 of solid circular cross section longitudinally over rollers 70 and has six cores 74 arranged with inner faces 77 of arcuate cross section and radiused so as to provide a constant small airgap relative to the object 72. The rollers 70 are freely rotatable on parallel axes and each have a peripheral recess 71 of concave arcuate cross section corresponding to the diameter of the object 72. Windings in the form of concentric coils 76 are fitted into slots in the cores 74.

FIGS. 12 and 13 show a conveyor employing a cylindrical linear motor which is positioned between two freely rotatable rollers 80, each having a peripheral recess 81 of arcuate cross section. The cylindrical linear motor comprises a plurality of circular coils 86 extending around the path of an object 82 of solid circular cross section which is to be conveyed. The magnetic circuit comprises a number of annular ferrous members 88 each having an outer diameter somewhat larger than that of coils 86 to operate as radiating fins and having a hole 87 of diameter such as to provide a uniform small airgap between the annular members 88 and the object 82.

The annular members 88 have slits 90 to prevent circulating currents from flowing in them, and C-shaped spacers 91, which space apart the annular ferrous members 88, encircle and enclose the coils 86. When the coils 86 are connected to a three-phase supply, the spacers 91 form a path for the magnetic flux to pass between the annular members 88. The flux path is then completed through the object 82 thereby inducing currents into it which provide a force to propel the object 82 along the rollers by electromagnetic interaction.

In order to switch off the supply when an object is not spanning the rollers, limit switches 100 are provided for each of the above linear motors. The motor is thus protected against excessive currents which would otherwise flow in such circumstances. The large force of magnetic attraction between the linear motor and the object would also be interrupted before the end passes over one of the rollers, thus avoiding an obstruction to the free passage of the object.

The above conveyors may, e.g., be used for charging bars to a furnace before the bars are formed into tubes, and have the advantage that they produce large propulsion forces. The above-described linear motors may of course be modified to convey objects other than objects of square or circular cross section, e.g., objects of rectangular cross section.

I claim:

1. A conveyor for moving objects along a path of travel comprising at least two roller means spaced along said path for supporting said objects, at least one short stator linear induction motor disposed adjacent said path of travel and between a pair of said roller means, said objects being supported by the roller means and accelerated by electromagnetic induction from said linear motor, each said roller having a peripheral recess of substantially V-shaped cross section for supporting said objects, each said at least one linear motor having a corresponding recess of substantially V-shaped cross section, each of said recesses being defined by faces which are inclined to one another at the same angle in the linear motor and in the roller means and which faces in the linear motor are parallel to the faces in the roller means, whereby objects of substantially circular cross section and of different diameters can be conveyed with a substantially constant gap between said objects and said linear motor.

2. A conveyor as claimed in claim 1, further comprising a pair of sensing devices spaced apart along said path with a linear motor disposed therebetween said sensing devices being arranged to control energization of said linear motor in response to sensing of an object on the path by the sensing devices.

3. A conveyor as claimed in claim 2, wherein the sensing devices comprise open-cored transformers connected to a trigger unit so that, on bridging of the gaps of the transformers by the object, voltages induced in the secondary windings of the transformers operate the trigger unit to energize the linear motor.

4. A conveyor as claimed in claim 3, wherein the trigger unit is one of a plurality of trigger units connected to receive a common speed signal for effecting phase control of a plurality of linear motors.